Figure 1:
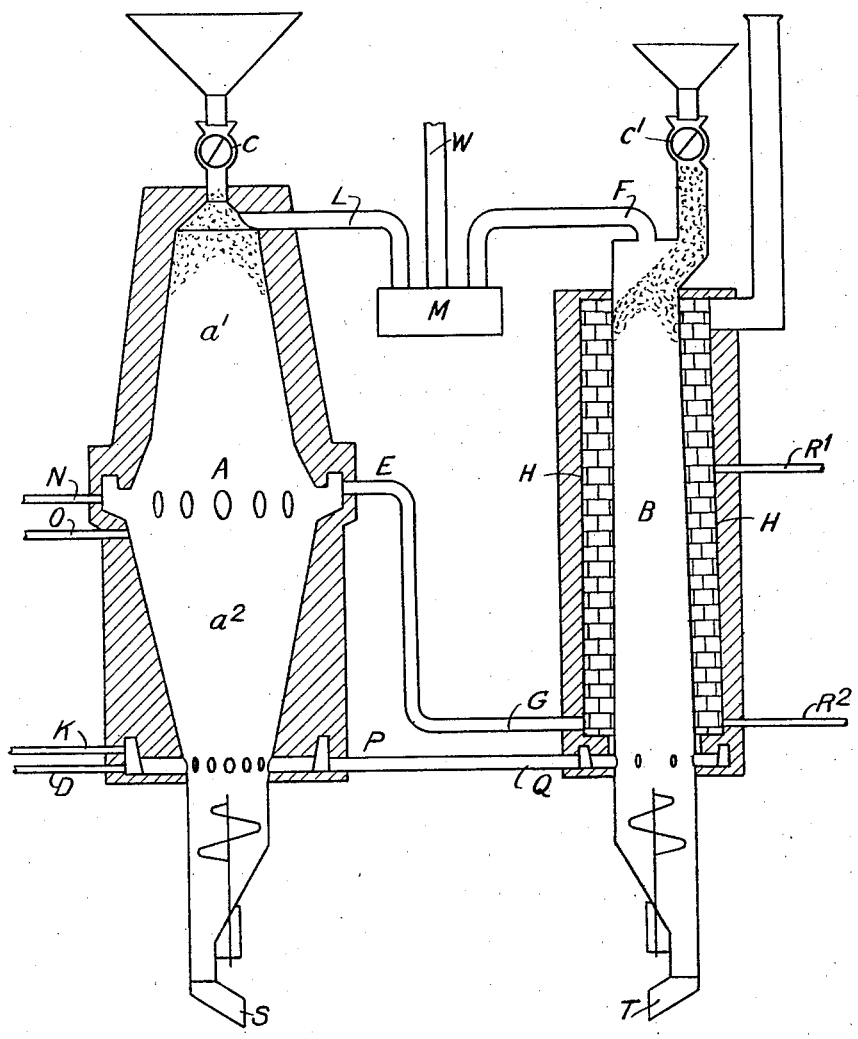

June 2, 1931. A. H. LYMN 1,808,672
PROCESS OF PRODUCING MIXED WATER GAS AND COAL GAS
Filed Feb. 23, 1927 2 Sheets-Sheet 1

INVENTOR:
ARTHUR H. LYMN

June 2, 1931. A. H. LYMN 1,808,672
PROCESS OF PRODUCING MIXED WATER GAS AND COAL GAS
Filed Feb. 23, 1927  2 Sheets-Sheet 2

INVENTOR:
ARTHUR H. LYMN

Patented June 2, 1931

1,808,672

UNITED STATES PATENT OFFICE

ARTHUR HENRY LYMN, OF LONDON, ENGLAND

PROCESS OF PRODUCING MIXED WATER GAS AND COAL GAS

Application filed February 23, 1927, Serial No. 170,365, and in Great Britain February 23, 1926.

This invention relates to a process of producing rich combustible gases and coke from bituminous fuel with the simultaneous recovery of by-products, ammonia and tar or tar oils.

In order to produce so-called "double-gas" or "mixed gas" (by which is meant a mixture consisting of water-gas and coal-gas) it has already been proposed to operate a shaft generator plant in conjunction with a gas retort plant, these plants working independently of each other and the gas from the former being mixed with the gas from the latter in adjustable proportions depending on the final heat value required. Such a proposal however suffers from the drawback that it necessitates an expensive plant and high fuel consumption for heating the gas retort plant.

My invention aims at overcoming this disadvantage and at providing a simple and economical plant for the production of so-called "double gas". To this end, in carrying out my invention, there is employed a double-run shaft generator plant of the "double-gas type" by which is meant a double-run shaft generator, in which a mixed gas consisting of water-gas and coal-gas is produced in one and the same shaft generator and one and the same operation and according to the invention the up-run gases from the gasification zone of the double-gas process are enriched in a known manner by passing through and distilling the bituminous fuel in the distillation zone superimposed on said gasification zone, while the down-run takes place through the gasification zone only and the resulting down-run gases are enriched by passing in a hot condition through an adjacent carbonization retort containing hot bituminous fuel directly but externally heated by the air blow-gases from the shaft generator, and such enriched down-run and up-run gases are thereupon mixed together to yield a rich combustible gas.

The carbonization in the carbonization retort may be assisted and the temperature of carbonization may be adjusted by introducing either saturated or more or less superheated steam or by circulating and either mixing or alternating with the combusted blow gases leaving the double-gas plant (heating the gas retort externally) a certain amount of cooled combustion gases from a previous cycle or even from an outside source.

Advantages of this combined process are that a comparatively rich final mixed gas is produced, its heat-value being adjustable according to the relative amounts of fuel treated in the double-gas and carbonization process respectively and likewise the amount and quality of coke produced may be varied to suit the coke market conditions existing from time to time, the carbonization temperatures in the retort being adjustable according to whether relatively high, medium or low temperature coke fuel and tar or oils are required. A further advantage is that the volatiles of the carbonization retort charge are carried away by the down-run gases of the double-gas process passing therethrough and thus the possible cracking into lower value products is largely avoided by getting these said volatiles away from the hot zone quicker than is usual in retort practice.

Figure 2:
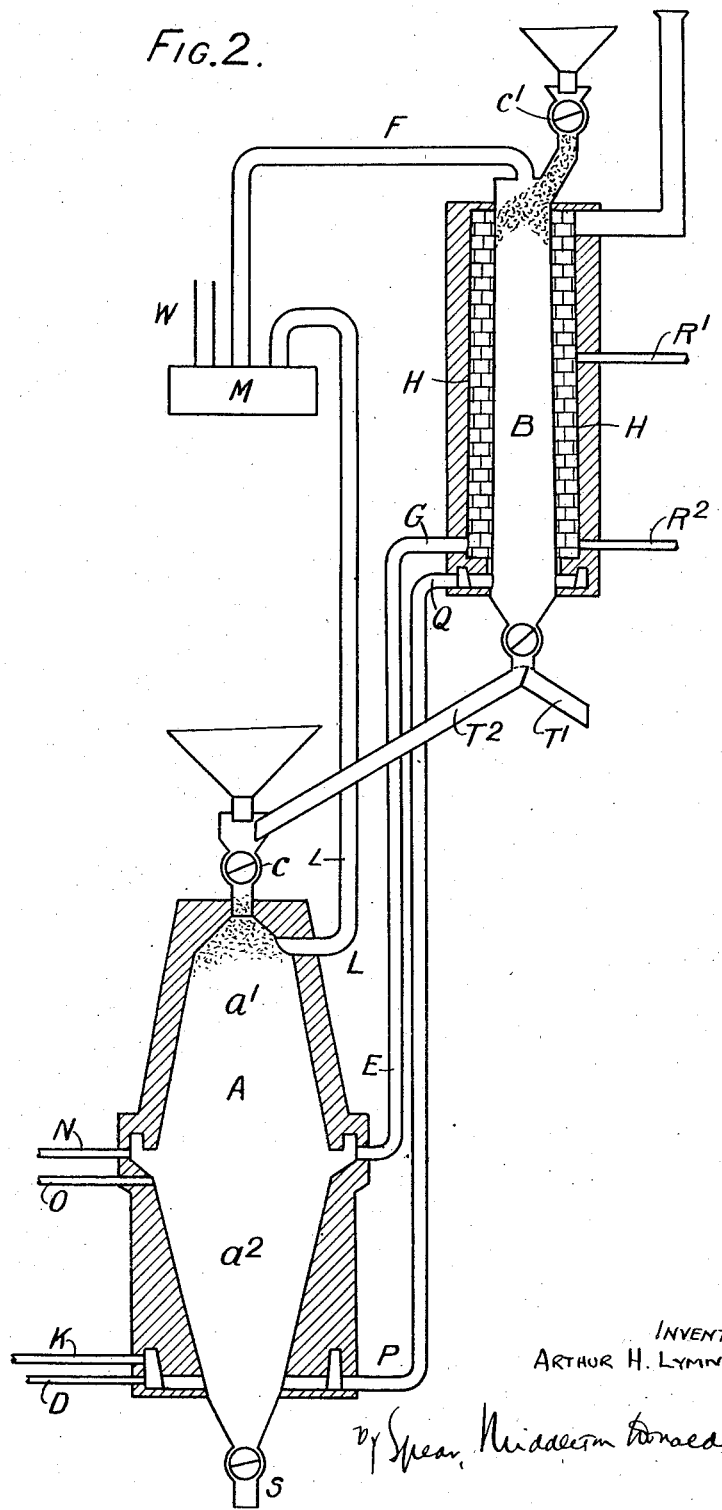

In order more clearly to understand the invention reference is made to the accompanying drawings which illustrate diagrammatically and by way of example, two embodiments of apparatus suitable for carrying the same into practical effect, and in which Fig. 1 is a sectional elevation of one embodiment and Fig. 2 is a sectional elevation of a modified embodiment.

In the embodiment illustrated in Fig. 1, the apparatus comprises:

One or more shaft gas generators A of the double run type each consisting of two sections or zones, an upper coal distillation zone $a'$ hereinafter referred to as the "distillation zone" and a lower water gas generating zone $a^2$, hereinafter referred to as the "gasification zone" the whole forming a complete unit of a double-gas plant.

One or more coal carbonization retorts B (preferably vertical) hereinafter referred to as the "carbonization retort".

The two units A and B may if desired to incorporated in a common setting.

In the operation of this process, both the shaft generator A and the carbonization retort B are charged mechanically or otherwise with bituminous coal by charging devices C and C' in the usual way. Air is blown in at D, at the bottom of the gasification zone and the resulting air-blow gases leaving in a hot condition at E between the gasification and distillation zones are led at G into the bottom of an external heating chamber surrounding as a jacket the carbonization retort B and burnt around the same, for example in firebrick flues H, thus heating the charge in the retort. The said firebrick flues H may also contain steam superheating pipes set therein.

In order completely to combust the air blow gases on their way through the firebrick flues H of the carbonization retort, secondary air may be admited for example at R' and R² or alternatively their complete combustion may be effected in a separate furnace (not shown) the resulting hot gases being thereupon passed through the heating chamber surrounding the carbonization retort B, and in order further to utilize the heat remaining in the combusted air flow gases may on leaving the firebrick flues be passed to a waste heat boiler of a known type.

At the end of the air-blow period the air is shut off at D whilst steam is admitted at the bottom of the gasification zone at K, and the resulting up-run water gases pass upwardly through the superimposed distillation zone, thereby distilling the coal contained therein and being enriched by the volatile hydrocarbons thus driven off. The resulting up-run gas containing the distillation gases of the bituminous coal leaves the distillation zone at L and is led away to a common seal box M and through pipe W to a condensing plant, not shown. In order to ensure the adequate distillation of the charge in the distillation zone, superheated steam may be introduced at N immediately beneath the said zone passing upwardly therethrough together with the up-run water gas.

At the end of the up-run the bottom steam inlet K and superheated steam inlet at the middle N and the top gas outlet L are shut off and down-run steam is admitted at O at the top of the gasification zone. The resulting down-run gas leaves the gasification zone in hot condition at P and is led into the interior of the carbonization retort through Q, passing upwardly therethrough and thereby internally carbonizing the charge of coal (already externally heated and partially carbonized by the air-blow gases as above described) and in its passage therethrough being enriched by the hydrocarbons thus volatilized from the coal therein. The resulting rich gas is conducted away from the top of the retort at F to the aforesaid common seal box M where it mixes with the gas from the double-gas generator A, and thence to a condensing plant.

At the end of the down-run period the steam is shut off at O of the gasification zone and air is again admitted at D and the whole cycle repeated.

It will be understood that the shaft generator A may be provided with suitable ash-discharging means S and that the carbonization retort or retorts B may be similarly provided with coke-discharging apparatus T, of a known type.

The temperature in the carbonization retort may be lowered to enable the production of lower temperature coke and tar products, if required by either mixing or alternating with the combusted air blow gases, from the double-gas plant (heating the carbonization retort externally) a suitable amount of cooled combustion gases from a previous cycle or from an outside source, in which case the combustion of the blow gases may preferably be effected in a separate furnace through which the blow gases are caused to pass on their way from the generator to the carbonization retort.

Fig. 2 illustrates a modified form of embodiment in which the carbonization retort B is set at such a position in relation to the shaft generator A as to allow the whole or any portion of the coke produced in B to be discharged into A. The relative quantities of coke passing into A through T² and out of T' may be regulated according to the market demand for coke existing from time to time, that is to say the coke produced in B may be discharged direct into A when the market price of coke for the time being is such that it would be uneconomical to sell the coke produced in B in the market. In the embodiment shown in Fig. 2, the fuel charged into the shaft generator A may be entirely bituminous coal or entirely coke or any mixture of the two.

It will be understood that the various means of adjustment above described will enable a relatively high, medium or low temperature carbonization to be carried on simultaneously with the double-gas process.

Where the change from one period to another of the process cycle requires the closing or opening of the valves not mentioned in the above description, such manipulation is to be taken as self understood as will be readily comprehended by those experienced in the art.

I claim:—

1. A process for producing a mixture of water gas and coal gas of uniform quality from bituminous fuel in a plant comprising an "up" and "down" steam run shaft gas generator with a water gas generating zone and superimposed coal distillation zone, and a coal carbonization retort in a detached shell; said process consisting in passing an air-blow upwardly through the water gas generating zone of said generator, passing the resulting air-blow gases directly from said water gas generating zone into external heating relation to said retort, then alternately passing steam up and down through the gasification zone to generate water gas, enriching both the "up-run" and the "down-run" water gases from said gasification zone by passing the "up-run" water gases through the fuel distillation zone in the shaft of said generator and simultaneously adding superheated steam at the base of the distillation zone, then passing the "down-run" water gases through said externally heated carbonization retort, mixing the thus enriched "up-run" gases with the thus enriched "down-run" gases to produce a rich combustible gas mixture, and passing coke from said detached carbonization retort into the shaft of said generator.

2. A process for producing a mixture of water gas and coal gas of uniform quality from bituminous fuel in a plant comprising an "up" and "down" steam run shaft gas generator with a water gas generating zone and superimposed coal distillation zone, and a coal carbonization retort in a detached shell; said process consisting in passing an air-blow upwardly through the water gas generating zone of said generator, passing the resulting air-blow gases directly from said water gas generating zone into external heating relation to said retort, then alternately passing steam up and down through the gasification zone to generate water gas, enriching both the "up-run" and the "down-run" water gases from said gasification zone by passing the "up-run" water gases through the fuel distillation zone in the shaft of said generator and simultaneously adding superheated steam at the base of the distillation zone, then passing the "down-run" water gases through said externally heated carbonization retort, and mixing the thus enriched "up-run" gases with the thus enriched "down-run" gases to produce a rich combustible gas mixture.

In testimony whereof, I have signed my name to this specification at London, England, this 11th day of February, 1927.

ARTHUR HENRY LYMN.